United States Patent
Cochran et al.

(10) Patent No.: US 9,850,377 B2
(45) Date of Patent: Dec. 26, 2017

(54) BLENDS OF STYRENE BUTADIENE COPOLYMERS WITH POLY(LACTIC ACID)

(71) Applicant: INEOS STYROLUTION GROUP GMBH, Frankfurt (DE)

(72) Inventors: Thomas W. Cochran, Channahon, IL (US); Michael Hamilton, Brownstown, MI (US)

(73) Assignee: INEOS STYROLUTION GROUP GMBH (DE)

( * ) Notice: Subject to any disclaimer, the term of this patent is extended or adjusted under 35 U.S.C. 154(b) by 0 days.

(21) Appl. No.: 15/035,692

(22) PCT Filed: Nov. 11, 2014

(86) PCT No.: PCT/EP2014/074243
§ 371 (c)(1),
(2) Date: May 10, 2016

(87) PCT Pub. No.: WO2015/067817
PCT Pub. Date: May 14, 2015

(65) Prior Publication Data
US 2016/0297961 A1  Oct. 13, 2016

(30) Foreign Application Priority Data

Nov. 11, 2013 (EP) .................. 13192305
Dec. 18, 2013 (EP) .................. 13198041

(51) Int. Cl.
C08L 67/00 (2006.01)
C08L 67/04 (2006.01)
C08F 297/04 (2006.01)

(52) U.S. Cl.
CPC .......... *C08L 67/04* (2013.01); *C08F 297/046* (2013.01)

(58) Field of Classification Search
None
See application file for complete search history.

(56) References Cited

U.S. PATENT DOCUMENTS

| | | |
|---|---|---|
| 5,883,199 A | 3/1999 | McCarthy et al. |
| 6,031,053 A | 2/2000 | Knoll et al. |
| 6,197,889 B1 | 3/2001 | Knoll et al. |
| 7,354,973 B2 | 4/2008 | Flexman |
| 8,076,406 B2 | 12/2011 | Brule et al. |
| 2007/0182041 A1 | 8/2007 | Rizk et al. |
| 2009/0012194 A1* | 1/2009 | Okuda ............... C08L 23/06 521/139 |
| 2010/0317801 A1 | 12/2010 | Hirasawa |
| 2013/0065046 A1 | 3/2013 | Krishnaswamy |
| 2015/0183917 A1 | 7/2015 | Knoll et al. |

FOREIGN PATENT DOCUMENTS

| | | |
|---|---|---|
| EP | 0766706 A1 | 4/1997 |
| EP | 0859803 A1 | 8/1998 |
| EP | 1975195 A1 | 1/2008 |
| JP | 2006348060 A | 12/2006 |
| JP | 2011207967 A | 10/2011 |
| WO | 95/35335 A1 | 12/1995 |
| WO | 97/40079 A1 | 10/1997 |
| WO | 2007/092417 A1 | 8/2007 |
| WO | 2011/053627 A2 | 5/2011 |
| WO | 2012/112266 A1 | 8/2012 |
| WO | 2012/117040 A1 | 9/2012 |
| WO | 2014/001233 A1 | 1/2014 |

OTHER PUBLICATIONS

English Abstract and translation of JP 2006348060.
English Abstract of JP 2011207967.
English Abstract of WO 2012117040.

* cited by examiner

*Primary Examiner* — Ana L Woodward
(74) *Attorney, Agent, or Firm* — J.A. Lindeman & Co., PLLC

(57) ABSTRACT

The present invention relates to a polymer blend comprising 75-99.5% (w/w) of at least one polylactic acid) (PLA) and 0.5-25% (w/w) of at least one styrene butadiene copolymer containing at least 50% (w/w) styrene. The present invention further relates to the use of such polymer blend for producing products and to the resulting products. Moreover, an object of the present invention is the use of a styrene butadiene block copolymer having a dendrimer structure comprising 50-85% (w/w) styrene as an additive of polymer blends comprising at least 50% (w/w) of PLA and a method of producing the polymer blend according to the invention.

14 Claims, No Drawings

BLENDS OF STYRENE BUTADIENE COPOLYMERS WITH POLY(LACTIC ACID)

The present invention relates to a polymer blend comprising 75-99.5% (w/w) of at least one poly(lactic acid) (PLA) and 0.5-25% (w/w) of at least one styrene butadiene copolymer containing at least 50% (w/w) styrene. The present invention further relates to the use of such polymer blend for producing products and to the resulting products. Moreover, an object of the present invention is the use of a styrene butadiene block copolymer, having a dendrimer structure comprising 50-85% (w/w) styrene, as an additive for polymer blends, comprising at least 50% (w/w) of PLA, and a method of producing the polymer blends according to the invention.

Today, ecological sustainability gains increasing importance. This also applies to consumer products, including those made from or containing thermoplastic materials. In this field, it is particularly intended to reduce the amount of waste by using increasing amounts of biodegradable thermoplastics.

One of the biodegradable plastics usable in industrial applications so far is poly(lactic acid) (PLA). Today, molding products made of thermoplastic PLA are exemplarily used for single use packaging, such as for food packing. Exemplarily, food containers such as yoghurt cups are made of PLA.

However, despite the advantage of biodegradability, the applications for PLA are hampered by its rather brittle nature and general lack of appealing mechanical properties, particularly toughness, elasticity and flexibility.

It has been tried by polymer specialists to overcome these drawbacks by generating polymer blends comprising PLA and certain impact modifiers. In U.S. Pat. No. 5,883,199 blends comprising PLA with various amounts of aliphatic succinate-adipate polyester are disclosed. U.S. Pat. No. 7,354,973 discloses blends of PLA and ethylene copolymers. U.S. Pat. No. 8,076,406 teaches blending PLA with polyamides. US-A 2007/0182041 and WO 2007/092417 disclose blending PLA with poly-4-hydroxybutyrate. US-A 2013/0065046 discloses blending PLA with polyhydroxyalkanoate. WO 2012/112266 discloses blends comprising PLA and expoxy-functionalized polybutadiene.

In many of these PLA blends, the content of the impact modifier has to be in a comparably high range of more than 30% (w/w) to obtain a notably effect on toughness, ductility and/or elasticity.

Further, most of the raw material polymers are comparably expensive and not easy to handle during the production process, either when generating the polymer itself or when blending the components.

A number of comparably inexpensive blends which are easy to handle, improving the viscosity properties have been known in the art. WO 2012/117040, for example, teaches the improvement of viscosity properties of melted polylactame blends, by blending the latter with vinylaromate diene copolymers.

Such polymer blends, however, are based on polymers which are comparably elastic and tough on their own, such as the polylactame Nylon. The improvement was found in the context of the production process of non-degradable polymers rather than in the final products bearing the cooled polymer blends.

In the view of the above, there is still an unmet technical need for polymer blends comprising a large fraction of biodegradable polymers, such as PLA, which have desirably high tensile strength at break as well as desirable high energy at break, thus, which are less brittle while being tougher.

Surprisingly, it was found that blends comprising comparably low amounts of not more than 25% (w/w) of a styrene butadiene copolymer, comprising at least 50% (w/w) styrene, are comparably tough, ductile and elastic. Such styrene butadiene copolymers (SBC) are further producible at comparably low cost and comfortable to handle.

In a first aspect, the present invention relates to a polymer blend comprising:

A) 0.5-25% (w/w) of at least one styrene butadiene copolymer comprising
   A1.) at least 50% (w/w) styrene,
   A2.) at least 10% (w/w) butadiene, and optionally
   A3.) one or more other comonomers;
B) 75-99.5% (w/w) of at least one poly(lactic acid) (PLA); and optionally
C) 0 to 5% (w/w) of one or more additive(s).

It will be understood that preferably the polymer blend (composition) consists of:

A) 0.5-25% (w/w) of at least one styrene butadiene copolymer consisting of
   A1.) at least 50% (w/w) styrene,
   A2.) at least 10% (w/w) butadiene, and optionally
   A3.) one or more other comonomers;
B) 75-99.5% (w/w) of at least one poly(lactic acid) (PLA); and optionally
C) 0 to 5% (w/w) of one or more additive(s).

It will be understood that throughout the present invention, the percentages by weight (w/w) recited for a polymer blend or a polymer component preferably sum up to 100% (w/w).

As used herein, the term "polymer blend" may be understood in the broadest sense as any mixture of two or more polymer(s). Typically, the polymer blend will bear different physical and/or chemical characteristics in comparison to the unblended polymers, independent from another.

A polymer blend in the context of the present invention may be a miscible polymer blend (homogeneous polymer blend), i.e., a polymer blend bearing a single-phase structure, having essentially a single glass transition temperature (Tg). Alternatively, a polymer blend in the context of the present invention may also be an immiscible polymer blend (heterogeneous polymer blend), i.e., a polymer blend bearing two or more glass transition temperatures (Tgs) upon melting.

As used throughout the present invention, the glass transition temperature (Tg) may be determine according to differential scanning calorimetry (DSC) according to ISO 11357-2.

The optical and haptic appearance of a polymer blend according to the present invention may be smooth and uniform or pitted. Preferably, the appearance is smooth and uniform. The polymer blend may be transparent/pellucid or non-transparent/opaque. Preferably, a layer of not more than 0.5 mm thickness of the polymer blend is at least partly translucent.

A polymer (such as PLA) according to the present invention may be a homopolymer (i.e., a polymer comprising essentially a single type of monomer moieties) or a copolymer (i.e., a polymer comprising two or more type(s) of monomer moieties). Exemplarily, poly(lactic acid) (PLA) in the context of the present invention may preferably be a homopolymer, essentialy consisting of PLA monomer moieties.

The styrene butadiene copolymer is a copolymer comprising at least styrene and butadiene monomer moieties. A polymer according to the present invention (homopolymer or copolymer) may bear a linear or branched structure. Preferably, a homopolymer as used herein is an essentially linear polymer strand with essentially no or only few cross-linkages. A copolymer, such as SBC, may preferably bear a branched or even a star-like structure.

A copolymer may be a copolymer wherein the different types of monomer moieties (at least styrene and butadiene moieties) are evenly and homogeneously distributed over the polymer or may be a block copolymer. Preferably, the copolymer (i.e. SBC) of the present invention is a block copolymer.

Each polymer component of the polymer blend (e.g. the styrene butadiene copolymer and PLA and optionally further polymer(s)) may optionally comprise amounts of not more than 5% (w/w) of compounds not included in the polymer strand, thus, not covalently bound thereto or therein, such as, e.g., metals, cations, anions, fatty acids, weakeners, residuals of solvents etc. Preferably, the polymer blend does not comprise more than 5% (w/w) of compounds not included in the polymer, more preferably not more than 2% (w/w), even more preferably not more than 1% (w/w), in particular not more than 0.5% (w/w). These compounds not included in the polymer strand may be removed during processing the polymer blend (e.g. be means of one or more washing steps(s), one or more precipitation steps(s) or by means of thermal degradation) or may remain in the polymer blend as one or more additive(s).

A poly(lactic acid) (PLA) in the context of the present invention may be any PLA known in the art. The PLA may be essentially pure PLA comprising only lactic acid monomers or may be PLA comprising up to 10% (w/w), preferably not more than 8% (w/w), more preferably not more than 6% (w/w), even more preferably not more than 5% (w/w), even more preferably not more than 4% (w/w), even more preferably not more than 3% (w/w), even more preferably not more than 2% (w/w), in particular not more than 1% (w/w) of other monomer moieties included in the polymer.

As used herein, throughout the present invention term "essentially pure" in the context of a polymer indicates that it does not contain more than 1% (w/w), preferably not more than 0.5% (w/w), more preferably not more than 0.25% (w/w), in particular not more than 0.1% (w/w) other monomer moieties included in the polymer.

Preferably, the PLA has a melt flow index (MFI) (determined at a temperature of 210° C. and at a load of 2.16 kg according to ASTM procedure D1238) of less than 50 g/10 min, more preferably of less than 20 g/10 min, even more preferably of less than 10 g/10 min. As used throughout the present invention, the ASTM procedure D1238 is preferably said procedure in the version of 2013.

Preferably, the PLA has a melt flow index (MFI) (determined at a temperature of 210° C. and at a load of 2.16 kg according to ASTM procedure D1238) of at least 1 g/10 min, more preferably of at least 2 g/10 min, even more preferably of at least 3 g/10 min. The PLA has a melt flow index (MFI) (determined at a temperature of 210° C. and at a load of 2.16 kg according to ASTM procedure D1238) of between 1 and 50 g/10 min, more preferably of between 2 and 20 g/10 min, even more preferably of between 2 and 15 g/10 min, even more preferably of between 2 and 10 g/10 min, even more preferably of between 3 and 10 g/10 min, even more preferably of between 4 and 9 g/10 min, in particular of between 5 and 7 g/10 min.

As used herein, the term "at least one PLA" indicates that there may optionally be only one type or different types of PLA polymers in the polymer blend of the present invention. Such different types of PLA polymers may, exemplarily, have different molecular weights, different melt flow indices (MFIs) and/or different comonomer or additive compositions. A single type of PLA may be PLA bearing a molecular weight (Mw) range of +/−10%, a melt flow index (MFI) determined at a temperature of 210° C. and at a load of 2.16 kg according to ASTM procedure D1238 of +/−1 g/10 min and an essentially comparable monomer moiety composition and distribution over the polymer strand. Different types of PLA may vary in at least one of the aforementioned characteristics.

As throughout the invention, the term "molecular weight" or "Mw" may be understood in the broadest sense as the mass of a molecule or a section of a molecule (e.g., a polymer strand, a polymer block or a small molecule) provided in g/mol (Da) and kg/mol (kDa), respectively. Preferably, the molecular weight (Mw) may be the average weight in the population of molecules observed, i.e., the overall average of the molecular weight (Mw) of the molecules characterized by a certain Mw. The Mw is measured by known to the art methods.

As used herein, the term "at least one styrene butadiene copolymer" indicates that there may optionally be only one type or different types of butadiene copolymers in the polymer blend of the present invention.

Such different types of styrene butadiene copolymers may, exemplarily have different molecular weights, different melt flow indices (MFIs) and/or different comonomer or additive compositions. A single type of styrene butadiene copolymer may be styrene butadiene copolymers bearing a molecular weight (Mw) range of +/−10%, a melt flow index (MFI) determined at a temperature of 210° C. and at a load of 2.16 kg according to ASTM procedure D1238 of +/−1 g/10 min and an essentially comparable monomer moiety composition and distribution over the copolymer. Different types of styrene butadiene copolymers may vary in at least one of the aforementioned characteristics.

The person skilled in the art will know a number of routes for obtaining a styrene butadiene copolymer. A number of styrene butadiene copolymers are commercially available, such as Styroflex 2G66 (Styrolution Group GmbH, Frankfurt, Germany). Examples for synthetic routes are depicted in EP-A 0 766 706, EP-A 0 859 803, WO 2012/117040 and WO 2014/001233.

The polymer blend of the present invention may optionally comprise one or more additive(s). An as used herein the additive may be a polymer in the broadest sense or may be a non-polymer-like additive. Preferably, the additive, as used herein, is not a polymer. Preferably, an additive has either a wax/talcum-like appearance at normal conditions (20° C., 1013 mbar, no addition of solvents) and/or a molecular weight of not more than 5 kDa, in particular not more than 1 KDa. An additive as used in the context of the present invention may be any additive known for plastics in the art. Exemplarily, an additive may be a stabilizer (e.g. a light stabilizer (e.g., an UV-absorber), a process stabilizer, or a radical scavenger, a phenolic primary stabilizer), a glossing agent, an antioxidant, a metal deactivator, an antistatic agent, a flow agent, an anti-sticking agent, metal ions, fatty acids, a pigment (e.g. carbon black), a strengthener, a filling agent (kaolin, chalk, astonite, talcum, calcium carbonate, one or more silicate(s), titan dioxide, zinc oxide, graphite, grapheme, glass particle(s), carbon nanotubes, aluminum oxide, and/or a flame retardant.

An additive as used herein may be added to the polymer blend on purpose or may result from the production process of either the polymer raw components and/or the blending process (e.g., as residual(s) from solvent(s), monomer(s), activator(s), precipitation and/or purification step(s), degradation products from monomer(s), activator(s) and/or other pyrolytic product(s)). The additive may be added upon blending the polymer raw components and/or may be comprised in one or more of the polymer raw component(s).

As used in the context of the styrene butadiene copolymer, the term "styrene" may be understood as styrene monomer moiety embedded into the molecular structure of the copolymer by covalent linkage(s).

Likewise, the term "butadiene" may be understood as butadiene monomer moiety embedded into the molecular structure of the copolymer by covalent linkage(s). It will be understood that upon including the styrene and the butadiene moieties into the copolymer, an aliphatic double bond of the monomers will typically disappear.

Optionally, the copolymer further comprises up to 40% (w/w) other comonomers, i.e., other monomer moieties covalently embedded into the polymer structure of the copolymer. A comonomer as used herein may be any suitable comonomer known in the art. Preferably, a comonomer is a vinyl monomer, i.e., a monomer bearing, before being covalently embedded into the styrene butadiene copolymer, at least one aliphatic double bond. Exemplarily, a comonomer may be ethylene, propylene, vinyl chloride, vinyl fluoride, polyvinyl alcohol or vinyl acetate.

As used in the context of the present invention, the styrene butadiene copolymer may be any styrene butadiene copolymer comprising at least 50% (w/w) styrene, at least 10% (w/w) butadiene and not more than 40% (w/w) of other comonomers. The styrene butadiene copolymer may be a random styrene butadiene copolymer or may be a styrene butadiene block copolymer.

Accordingly, in a preferred embodiment, the styrene butadiene copolymer is a block copolymer.

As used herein, the term "block copolymer" may be understood in the broadest sense as any copolymer having a defined polymer structure.

As indicated above, the styrene butadiene copolymer according to the present invention may comprise 50-90% (often 50 to 85) % (w/w) styrene moieties and 10-50% (often 15-50) % (w/w) butadiene moieties and, optionally one or more type(s) of other comonomer(s).

Preferably, the styrene butadiene copolymer comprises at least 55% (w/w) styrene, more preferably at least 60% (w/w), even more preferably at least 65% (w/w), in particular at least 70% (w/w) styrene. Preferably, the styrene butadiene copolymer comprises not more than 90% (w/w) styrene, more preferably not more than 88% (w/w), even more preferably not more than 85% (w/w), in particular not more than 80% (w/w) styrene. Preferably, the styrene butadiene copolymer comprises 60-90% (w/w) styrene, more preferably 65-90% (w/w), even more preferably 65-88% (w/w) styrene, more preferably 65-85% (w/w) styrene, even more preferably 70-85% (w/w) styrene, even more preferably 70-80% (w/w) styrene, in particular 72-78% (w/w) styrene.

Preferably, the styrene butadiene copolymer comprises 5-45% (w/w) butadiene, more preferably 10-40% (w/w) butadiene, even more preferably 15-35% (w/w) butadiene, even more preferably 15-30% (w/w) butadiene, even more preferably 20-30% (w/w) butadiene, in particular 22-28% (w/w) butadiene.

Preferably, the styrene butadiene copolymer comprises not more than 25% (w/w) of other comonomer(s), more preferably not more than 20% (w/w), even more preferably not more than 15% (w/w), even more preferably not more than 10% (w/w), even more preferably not more than 5% (w/w), in particular not more than 1% (w/w) or essentially no other comonomer(s).

In a preferred embodiment, the styrene butadiene copolymer (SBC) comprises:
A1) 50-85% (w/w) styrene,
A2) 15-50% (w/w) butadiene, and
A3) 0-25% (w/w) other comonomer(s).

Preferably, the styrene butadiene copolymer (SBC) consists of:
A1) 50-85% (w/w) styrene,
A2) 15-50% (w/w) butadiene, and
A3) 0-25% (w/w) other comonomer(s).

More preferably, the SBC is a block copolymer comprising:
A1) 70-85% (w/w) styrene,
A2) 15-30% (w/w) butadiene, and
A3) 0-15% (w/w) other comonomer(s).

Even more preferably, the styrene butadiene copolymer (SBC) consists of:
A1) 70-85% (w/w) styrene,
A2) 15-30% (w/w) butadiene, and
A3) 0-15% (w/w) other comonomer(s).

Even more preferably, the SBC is a block copolymer comprising:
A1) 70-80% (w/w) styrene,
A2) 20-30% (w/w) butadiene, and
A3) 0-10% (w/w) other comonomer(s).

Even more preferably, the SBC is a block copolymer comprising:
A1) 72-78% (w/w) styrene,
A2) 22-28% (w/w) butadiene, and
A3) 0-6% (w/w) other comonomer(s).

Exemplarily, the SBC is a block copolymer consisting of
A1) 72-78% (w/w) styrene, and
A2) 22-28% (w/w) butadiene.

Exemplarily, the SBC is a block copolymer consisting of
A1) (approximately) 75% (w/w) styrene, and
A2) (approximately) 25% (w/w) butadiene.

As mentioned above, the styrene butadiene copolymer according to the present invention may have any structure, but preferably is a block copolymer. Exemplarily, such styrene butadiene block copolymer is such described in WO 2012/117040 or WO 2014/001233.

In a more preferred embodiment, the styrene butadiene copolymer is a block copolymer having a branched structure, preferably has a dendrimer structure, more preferably a first generation dendrimer structure, in particular a first generation dendrimer structure having four branches.

As used herein, the term "branched structure" may be understood in the broadest sense any structure deviating from a plain linear structure. Accordingly, in a polymer of branched structure, there is at least one monomer binding to three or more other monomer(s).

The styrene butadiene block copolymer according to the present invention may optionally be an asymmetric, star-like branched block copolymer. Exemplarily, the styrene butadiene block copolymer may be bear one of the following structures:

St1-Bu1-Bu2-x +St2-Bu2-x;
St1-Bu1-Bu2→St3-x +St2-Bu2→St3-x;
St1-Bu1-Bu2-x+St2-St3-Bu2-x+St3-Bu2-x;

St1-Bu1-Bu2→St4-x +St2-St3-Bu2→St4-x+St3-Bu2→St4-x;

St1-Bu1-Bu2-Bu3-x+St2-Bu2-Bu3-x+St3-Bu3-x;

St1-St2-Bu1-Bu2-x+St2-Bu1-Bu2-x+St3-Bu2-x;

St1-St2-Bu1-Bu2→St4 -x+St2-Bu1-Bu2→St4-x+St3-Bu2→St4-x;

St1-(St/Bu)1-(St/Bu)2-x+St2-(St/Bu)2-x;

St1-(St/Bu)1-(St/Bu)2-x+St2-St3-(St/Bu)2-x+St3-(St/Bu)2-x;

St1-Bu1-Bu2-Bu3→S4-x+St2-Bu2-Bu3→S4-x+St3-Bu3→S4-x;

wherein "St" refers to styrene, "Bu" refers to butadiene, the arrow ("→") refers to a blurred passage from butadiene to styrene (i.e., no clear change of the block, but a changing distribution of monomers over the polymer strand), the diagonal slash ("/") refers to a statistical copolymerization with essentially homogenous monomer distribution. The different branches of the branched block copolymers are indicated by a plus sign ("+") and "x" refers to the conjugation to the coupling compound.

The person skilled in the art will know how to obtain such polymers. Further, exemplarily synthetic rotes are shown in WO 2014/001233.

In a preferred embodiment, the styrene butadiene copolymer is an anionically produced block copolymer containing:

(i) at least one block of styrene-containing hard phase with a glass transition temperature (Tg)>70° C., and (ii) at least one block of butadiene-containing soft phase with Tg<0° C.

One or more of the styrene-containing hard phase(s) may or may not comprise butadiene moieties at an amount of not more than 45% (w/w), preferably not more than 25% (w/w). One or more of the butadiene-containing soft phase(s) may or may not comprise styrene moieties at an amount of not more than 45% (w/w), preferably not more than 25% (w/w).

In a preferred embodiment, the styrene butadiene copolymer comprises at least one butadiene-containing soft-phase block comprising styrene in an amount of 1-45% (w/w) having an overall Tg<0° C. This means that in the butadiene-containing soft-phase block, there are at least some styrene moieties present. These may be randomly distributed in the butadiene-containing soft-phase block or be present in a higher concentration in a part of the butadiene-containing soft-phase block. These styrene moieties may preferably not form strands comprising ten or more consecutively adjacent styrene moieties.

As used in the context of the present invention, the polymer blend according to the present invention may comprise at least 0.5% (w/w) of at least one styrene butadiene copolymer. Preferably, the polymer blend according to the present invention may comprise not more than 20% (w/w) of at least one styrene butadiene copolymer, more preferably not more than 15% (w/w), even more preferably not more than 10% (w/w), in particular not more than 5% (w/w) of at least one styrene butadiene copolymer.

Preferably, the polymer blend according to the present invention may comprise at least 80% (w/w) of at least one PLA, more preferably at least 90% (w/w), in particular at least 95% (w/w) of at least one PLA.

Preferably, the polymer blend according to the present invention may comprise at least 0.1% (w/w) of one or more additive(s), more preferably at least 0.2% (w/w), even more preferably at least 0.3% (w/w), even more preferably at least 0.4% (w/w), in particular at least 0.5% (w/w) of one or more additive(s).

Accordingly, in a preferred embodiment, the polymer blend according to the present invention comprises:

A) 0.5-10% (w/w) of at least one styrene butadiene copolymer,

B) 90-99.4% (w/w) of at least one PLA; and

C) 0.1 to 5% (w/w) of one or more additive(s).

As mentioned above, also in this context, it will be understood that the percentages by weight (w/w) recited for such polymer blend may preferably sum up to 100% (w/w).

Therefore, more preferably, the polymer blend according to the present invention consists of:

A) 0.5-10% (w/w) of at least one styrene butadiene copolymer,

B) 89.9-99.4% (w/w) of at least one PLA; and

C) 0.1 to 5% (w/w) of one or more additive(s).

Even more preferably, the polymer blend according to the present invention consists of:

A) 1-10% (w/w) of at least one styrene butadiene copolymer,

B) 89.9-98.9% (w/w) of at least one PLA; and

C) 0.1 to 5% (w/w) of one or more additive(s).

In an even more preferred embodiment, the polymer blend according to the present invention comprises:

A) 1-5% (w/w) of at least one styrene butadiene copolymer,

B) 94-98.5% (w/w) of at least one PLA, and

C) 0.5 to 5% (w/w) of one or more additive(s).

Even more preferably, the polymer blend according to the present invention consists of:

A) 1-5% (w/w) of at least one styrene butadiene copolymer,

B) 94.5-98.5% (w/w) of at least one PLA, and

C) 0.5 to 5% (w/w) of one or more additive(s).

In an even more preferred embodiment, the polymer blend according to the present invention comprises:

A) 1-5% (w/w) of at least one styrene butadiene block copolymer having a dendrimer structure, B) 94-99% (w/w) of at least one PLA, wherein the PLA has a melt flow index (MFI) of between 4 and 10 g/10 min (determined at a temperature of 210° C. and at a load of 2.16 kg according to ASTM procedure D1238)

C) 0 to 5% (w/w) of one or more additive(s).

Even more preferably, the polymer blend consists of:

A) 1-5% (w/w) of at least one styrene butadiene block copolymer having a dendrimer structure, B) 95-99% (w/w) of at least one PLA, wherein the PLA has a melt flow index (MFI) of between 4 and 10 g/10 min (determined at a temperature of 210° C. and at a load of 2.16 kg according to ASTM procedure D1238)

C) 0 to 5% (w/w) of one or more additive(s).

Even more preferably, the polymer blend according to the present invention comprises:

A) 1-5% (w/w) of at least one styrene butadiene block copolymer having a dendrimer structure, B) 94-98.5% (w/w) of at least one PLA, wherein the PLA has a melt flow index (MFI) of between 4 and 10 g/10 min (determined at a temperature of 210° C. and at a load of 2.16 kg according to ASTM procedure D1238)

C) 0.5 to 5% (w/w) of one or more additive(s).

Accordingly, even more preferably, the polymer blend consists of:

A) 1-5% (w/w) of at least one styrene butadiene block copolymer having a dendrimer structure, B) 94.5-98.5% (w/w) of at least one PLA, wherein the PLA has a melt flow index (MFI) of between 4 and 10 g/10 min (determined at a temperature of 210° C. and at a load of 2.16 kg according to ASTM procedure D1238)

C) 0.5 to 5% (w/w) of one or more additive(s).

As indicated above, the polymer blend according to the present invention is comparably tough, elastic and ductile.

Accordingly, such polymer blend may very well be used for the production of any product producible from a tough, elastic and ductile plastic.

Accordingly, a further aspect of the present invention relates to the use of the polymer blend according to the present invention for producing a product selected from the following:
(i) film material,
(ii) packing material,
(iii) a plastics molding,
(iv) fiber or yarn,
(v) foam,
(vi) a fabric or tissue,
(vii) a composite
(viii) micro- or nanobeads, and
(ix) an implant,
preferably wherein said polymer blend constitutes for more than 50% (w/w), in particular for more than 60% (w/w) of said product.

In this context, even more preferably, the polymer blend constitutes for more than 70% (w/w), even more preferably for more than 80% (w/w), even more preferably for more than 90% (w/w) of such product, in particular wherein such product essentially consists of a polymer blend according to the present invention.

Producing one or more of such products may be performed by any means known in the art. Exemplarily, by extrusion, injection molding, casting, blow molding, spraying, spinning, rolling, weaving, forming a suspension from an emulsion etc. or a combination of two or more thereof. The person skilled in the art will know which method(s) to apply for producing the respective product.

The term "film material" as used herein may be understood in the broadest sense as any thin and flexible material. Preferably, the film material has a thickness of less than 5 mm, more preferably of less than 2 mm, even more preferably of less than 1 mm, in particular of not more than 0.5 mm. Preferably, but not necessarily, the film material is pellucid. The film material may be used for any purpose such as, exemplarily, for packing goods (e.g., foods, beverages, food or beverage containers, consumer goods, books, clothes, electrics etc.) or may be used as plastic bags, slides, stickers, blister packing etc. Exemplarily, a film material may be produced by blow molding or rolling.

As used herein, the term "packing material" may be understood in the broadest sense as any product for packing. Packing material may be a film material or may be a less flexible material of a higher thickness such as, e.g., a food or beverage container, a blister packing, tableware etc. Exemplarily, a packing material may be produced by blow molding, extrusion, injection molding or rolling.

The term "plastics molding" as used herein may be understood in the broadest sense as producing any shaped piece. Exemplarily, a plastics molding may be produced by extrusion, injection molding or rolling.

Exemplarily, a fiber or yarn may be produced in a way including spinning, rolling, weaving and may, then, optionally, be subjected to weaving forming a fabric or tissue.

A composite may be any composite in the art. Preferably, a composite may further comprise one or more layers of a metal or alloy, one or more layers of other plastic material(s) and/or one or more layer(s) of cardboard. Preferably, a composite may further comprise one or more metal or alloy film(s), one or more films of other plastic material(s) or a thin cardboard of not more than 1.5 mm in thickness. Then, exemplarily, a liquid packaging board may be produced.

Micro- or nanobeads may exemplarily be formed generating a suspension from an emulsion or by spraying. Micro- or nanobeads and/or an implant may also comprise one or more pharmaceutically active agent(s) including drugs, growth factors etc. Micro- or nanobeads and/or an implant may be coated by another pharmaceutically acceptable polymer.

Accordingly, such products comprising the polymer blend according to the present invention are also embraced by the present invention.

Thus, a still further aspect of the present invention refers to a product comprising the polymer blend according to the present invention, wherein said product is selected from the group consisting of:
(i) film material,
(ii) packing material,
(iii) a plastics molding,
(iv) fiber or yarn,
(v) foam,
(vi) a fabric or tissue,
(vii) a composite
(viii) micro- or nanobeads, and
(ix) an implant,
wherein said polymer blend constitutes for more than 50% (w/w), in particular for more than 60% (w/w) of said product.

As a polymer blend comprising at least 50% (w/w) PLA can be improved by blending it with one or more styrene butadiene copolymers according to the present invention, also the use of such styrene butadiene copolymers for improving PLA blends is embraced by the present invention.

Accordingly, in a further aspect, the present invention relates to the use of a styrene butadiene copolymer that is a block copolymer having a dendrimer structure comprising
A1) 50-85% (w/w) styrene,
A2) 15-50% (w/w) butadiene, and
A3) 0-25% (w/w) other comonomer(s)
as a polymeric additive of polymer blends comprising at least 50% (w/w) of at least one PLA, wherein said styrene butadiene copolymer is defined as above.

Herein, the styrene butadiene copolymer is defined as in the context of the polymer blend above. Preferably, the polymer blend comprises at least 50% (w/w), more preferably at least 60% (w/w), even more preferably at least 70% (w/w), even more preferably at least 80% (w/w), even more preferably at least 90% (w/w), in particular at least 95% (w/w) of at least one PLA.

The polymer blend according to the present invention may be prepared by any means known in the art.

In a still further aspect, the present invention refers to a method of producing a polymer blend according to the present invention comprising the steps of:
(i) blending of at least one styrene butadiene copolymer and of at least one PLA and optionally one or more additive(s) under conditions at which the styrene butadiene copolymer(s) and the PLA(s) can be mixed,
(ii) hardening the blend obtained from step (i).

Blending the component according to step (i) may be performed by any means known in the art. Exemplarily, the step (i) of blending the components may be performed by extruding the components. Preferably, the components are heated during they are blended, more preferably heated above their glass transition temperature (Tg).

Subsequently, the blend is preferably cooled below the glass transition temperature (Tg) of the components.

Therefore, in a preferred embodiment, in the method according to the present invention, step (i) comprises the heating of the at least one styrene butadiene copolymer and the at least one PLA above the glass transition temperatures (Tgs) of said at least one styrene butadiene copolymer and said at least one PLA; and step (ii) comprises the cooling of the blend below the glass transition temperature (Tg) of the blend.

The invention is further explained by the following examples and paten claims.

EXAMPLES

Preparing Blends of Styrene Butadiene Copolymers with Poly(Lactic Acid)

Polylactic acid (commercial product Ingeo 2002D (NatureWorks LLC, Minnetonka, Minn., USA)) was compounded with an impact modifier using a twin-screw extruder with a melt temperature of from 180 to 210° C. The melt was passed through a die plate to form strands roughly 3 mm in diameter. Polymer strands were passed through a water bath to cool them and then the cooled polymer was cut into pellets roughly 3 mm in length.

Pellets of the compounded polymer blend were injection molded at from 160 to 180° C. into Type I tensile bar specimen. The specimens were tested for ductility and toughness by stressing the specimen in tension according to ASTM procedure D638.

The PLA materials were obtained from NatureWorks LLC as general purpose extrusion grade products Ingeo 2002D and Ingeo Biopolymer 2003D (both NatureWorks LLC, Minnetonka, Minn., USA)). The impact modifier is provided by Styrolution, LLC as Styroflex 2G66 (Styrolution Group GmbH, Frankfurt, Germany).

Example I

Improvement of Poly(lactic acid) Ingeo 2002D by blending it with the styrene butadiene block copolymer (Styroflex 2G66)

The styrene butadiene block copolymer (SBC) Styroflex 2G66 was blended with poly(lactic acid). The effect of admixing 20% (w/w) on energy to break and tensile strain at break (see DIN EN ISO 527) is shown in Table 1 below.

TABLE 1

Blend of Poly(lactic acid) Ingeo 2002D with Styroflex 2G66

| Test | Units | PA.1 | QA.20 |
|---|---|---|---|
| 2002D CL Ingeo | % | 100 | 80 |
| Styroflex 2G66 | % | 0 | 20 |
| Tensile stress at break | Psi | 9478 | 3791 |
| Tensile strain at break | % | 3.5 | 38.7 |
| Energy to break | in-lbf | 53 | 389 |

The above data clearly show that the tensile strain at break is increased from 3.5% for pure PLA to more than 38% for a blend comprising 20% (w/w) of the styrene butadiene block copolymer. Likewise, the energy to break is increased from 53 to 389 in-lbf. Therefore, the blend is significantly improved with respect to toughness and elasticity.

Example II Improvement of Poly(lactic acid) Ingeo Biopolymer 2003D by blending it with the styrene butadiene block copolymer (Styroflex 2G66)

Various amounts of the styrene butadiene block copolymer (SBC) Styroflex 2G66 were blended with poly(lactic acid). The effect of admixing amounts of from 5 to 20% (w/w) on energy to break and tensile strain at break is shown in Table 2 below.

TABLE 2

Blend of Poly(lactic acid) Ingeo Biopolymer 2003D with Styroflex 2G66

| Test | Units | P.1 | Q.5 | Q.10 | Q.15 | Q.20 |
|---|---|---|---|---|---|---|
| Ingeo Biopolymer 2003D | % | 100 | 95 | 90 | 85 | 80 |
| Styroflex 2G66 | % | 0 | 5 | 10 | 15 | 20 |
| Tensile stress at break | psi | 3787 | 4060 | 4253 | 3863 | 4794 |
| Tensile strain at break | % | 14 | 159 | 146 | 84 | 212 |
| Energy to break | in-lbf | 154 | 1612 | 1452 | 860 | 2127 |

The above data clearly show that, already at a content of the styrene butadiene block copolymer of only 5% (w/w), the tensile strain at break is increased from 14% for pure PLA to more than 159%. Likewise, the energy to break is increased from 154 to 1612 in-bf. Therefore, the blend is significantly improved with respect to toughness and elasticity.

At contents of the styrene butadiene block copolymer of 10% (w/w) and 20% (w/w), respectively, the determined toughness and elasticity decreased and raised at a content of 20% (w/w). Nevertheless, in the entire range of between 0 and 20% (w/w), the values determined for the tensile strain at break and the energy at break are dramatically higher in comparison to PLA alone.

Example III

Improvement of Poly(lactic acid) Ingeo Biopolymer 2003D by blending it with two different styrene butadiene block copolymers (Styrolux 6481 and Styrolux 3G55, both of Styrolution Group GmbH, Frankfurt, Germany).

Various amounts of two styrene butadiene block copolymers (SBC) were blended with poly(lactic acid). The effect of admixing on energy to break and tensile strain at break is shown in Table 3 below.

Styrolux 6481 is a styrene butadiene copolymer with an overall butadiene content of 36% and containing one block with a random arrangement of butadiene and styrene. Styrolux 3G55 is likewise a similar styrene butadiene copolymer, however, containing an overall butadiene content of only 25%.

TABLE 3

Blends of Poly(lactic acid) Ingeo Biopolymer 2003D with two styrene butadiene copolymers.

| Test | Units | QB.10 | QB.20 | QC.15 | QC.25 |
|---|---|---|---|---|---|
| Ingeo Biopolymer 2003D | % | 90 | 80 | 85 | 70 |
| Styrolux 6481 | % | 10 | 20 | | |
| Styrolux 3G55 | % | | | 15 | 30 |
| Tensile stress at break | Psi | 4296 | 3552 | 4382 | 5242 |
| Tensile strain at break | % | 99 | 112 | 111 | 282 |
| Energy to break | in-lbf | 1029 | 1062 | 1154 | 2863 |

As noted above, addition of the styrene butadiene copolymer results in a significant improvement in material toughness as evidenced by the large increase in tensile strain at break and energy to break in comparison to the PLA alone (Sample P.1 from Table 2 in this case).

From the Tables 2 and 3, it will be noted that already at a content of 10% (w/w) or even lower of styrene butadiene copolymer a significant increase in energy to break, tensile stress at break and tensile strain at break of the blends is achieved.

The invention claimed is:

1. A polymer blend comprising:
   A) 0.5-10% (w/w), based on the total mass of the polymer blend, of at least one styrene butadiene copolymer comprising
      A1.) at least 50% (w/w), based on the total mass of the at least one styrene butadiene copolymer, of styrene moieties,
      A2.) at least 10% (w/w), based on the total mass of the at least one styrene butadiene copolymer, of butadiene moieties, and optionally
      A3.) one or more other comonomer moieties;
   B) 90-99.5% (w/w), based on the total mass of the polymer blend, of at least one poly(lactic acid) (PLA); and optionally
   C) 0 to 5% (w/w), based on the total mass of the polymer blend, of one or more additive(s).

2. The polymer blend according to claim 1, wherein the styrene butadiene copolymer is a block copolymer.

3. The polymer blend according to claim 1, wherein the styrene butadiene copolymer comprises:
   A1) 50-85% (w/w) styrene moieties;
   A2) 15-50% (w/w) butadiene moieties; and
   A3) 0-25% (w/w) other comonomer moieties.

4. The polymer blend according to claim 1, wherein the styrene butadiene copolymer is selected from the group consisting of a block copolymer having a branched structure, a block copolymer having a dendrimer structure, a block copolymer having a first generation dendrimer structure, and a block copolymer having a first generation dendrimer structure having four branches.

5. The polymer blend according to claim 1, wherein the styrene butadiene copolymer is an anionically produced block copolymer containing:
   (i) at least one block of styrene-containing hard phase with a glass transition temperature (Tg) >70° C.; and
   (ii) at least one block of butadiene-containing soft phase with Tg <0° C.

6. The polymer blend according to claim 1, wherein the styrene butadiene copolymer comprises at least one butadiene-containing soft-phase block, wherein said soft-phase block comprises styrene moieties in an amount of 1-45% (w/w), based on the total mass of the soft-phase block, and has an overall Tg <0° C.

7. The polymer blend according to claim 1 comprising:
   A) 0.5-10% (w/w) of at least one styrene butadiene copolymer;
   B) 90-99.4% (w/w) of at least one PLA; and
   C) 0.1 to 5% (w/w) of one or more additive(s).

8. The polymer blend according to claim 1 comprising:
   A) 1-5% (w/w) of at least one styrene butadiene copolymer;
   B) 94-98.5% (w/w) of at least one PLA; and
   C) 0.5 to 5% (w/w) of one or more additive(s).

9. The polymer blend according to claim 1 comprising:
   A) 1-5% (w/w) of at least one styrene butadiene block copolymer having a dendrimer structure;
   B) 94-99% (w/w) of at least one PLA, wherein the PLA has a melt flow index (MFI) of between 4 and 10 g/10 min (determined at a temperature of 210° C. and at a load of 2.16 kg according to ASTM procedure D1238); and optionally
   C) 0 to 5% (w/w) of one or more additive(s).

10. A product comprising the polymer blend according to claim 1, wherein said product is selected from the group consisting of:
    (i) film material,
    (ii) packing material,
    (iii) a plastics molding,
    (iv) fiber or yarn,
    (v) foam,
    (vi) a fabric or tissue,
    (vii) a composite
    (viii) micro- or nanobeads, and
    (ix) an implant,
wherein said polymer blend constitutes for more than 50% (w/w) of said product.

11. The product according to claim 10, wherein the polymer blend constitutes for more than 60% (w/w) of said product.

12. A method of producing a polymer blend according to claim 1 comprising the steps of:
    (i) blending of at least one styrene butadiene copolymer and of at least one PLA and optionally one or more additive(s) under conditions at which the styrene butadiene copolymer(s) and the PLA(s) can be mixed; and
    (ii) hardening the blend obtained from step (i).

13. The method according to claim 12, wherein:
    step (i) comprises the heating of the at least one styrene butadiene copolymer and the at least one PLA above the glass transition temperatures (Tgs) of said at least one styrene butadiene copolymer and said at least one PLA; and
    step (ii) comprises the cooling of the blend below the glass transition temperature (Tg) of the blend.

14. A polymer blend comprising a styrene butadiene copolymer that is a block copolymer having a dendrimer structure, wherein said styrene butadiene copolymer comprises:
    A1) 50-85% (w/w) styrene moieties,
    A2) 15-50% (w/w) butadiene moieties, and
    A3) 0-25% (w/w) other comonomer moieties,
wherein the polymer blend comprises at least 50% (w/w), based on the total mass of the polymer blends, of at least one PLA, and
wherein said styrene butadiene copolymer is selected from the group consisting of a block copolymer having a first generation dendrimer structure.

* * * * *